(12) United States Patent
Ohkubo

(10) Patent No.: US 11,608,043 B2
(45) Date of Patent: Mar. 21, 2023

(54) VEHICLE ELECTRIC BRAKE DEVICE

(71) Applicant: TOYOTA JIDOSHA KABUSHIKI KAISHA, Toyota (JP)

(72) Inventor: Masayasu Ohkubo, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 181 days.

(21) Appl. No.: 17/076,221

(22) Filed: Oct. 21, 2020

(65) Prior Publication Data
US 2021/0162977 A1 Jun. 3, 2021

(30) Foreign Application Priority Data
Dec. 2, 2019 (JP) .............................. JP2019-218325

(51) Int. Cl.
| | | |
|---|---|---|
| *B60T 13/74* | (2006.01) | |
| *B60T 8/1761* | (2006.01) | |
| *F16D 55/02* | (2006.01) | |
| *F16D 121/24* | (2012.01) | |

(52) U.S. Cl.
CPC .......... B60T 13/746 (2013.01); B60T 8/1761 (2013.01); F16D 55/02 (2013.01); *F16D 2121/24* (2013.01); *F16D 2500/3118* (2013.01)

(58) Field of Classification Search
CPC .... B60T 8/176; B60T 8/1761; B60T 8/17616; B60T 8/17636; B60T 13/741; B60T 13/746; F16D 55/02; F16D 2121/24
See application file for complete search history.

(56) References Cited

U.S. PATENT DOCUMENTS

| | | | | |
|---|---|---|---|---|
| 6,138,801 A | * | 10/2000 | Shirai | F16D 65/22 188/162 |
| 6,153,988 A | * | 11/2000 | Reimann | F16D 65/18 318/40 |
| 6,173,820 B1 | * | 1/2001 | Blosch | F16D 65/567 188/71.8 |
| 6,179,097 B1 | * | 1/2001 | Schumann | F16D 65/18 188/162 |
| 6,189,661 B1 | * | 2/2001 | Schaffer | F16D 65/18 188/72.8 |
| 9,447,830 B2 | * | 9/2016 | Bull | F16D 65/18 |
| 10,612,613 B2 | * | 4/2020 | Feigel | B60T 13/741 |

(Continued)

FOREIGN PATENT DOCUMENTS

| | | |
|---|---|---|
| DE | 102018111573 A1 | 11/2018 |
| JP | 10-181578 A | 7/1998 |

(Continued)

*Primary Examiner* — Nicholas J Lane
(74) *Attorney, Agent, or Firm* — Sughrue Mion, PLLC

(57) ABSTRACT

An electric brake device for a vehicle, including: a rotation body that rotates with a wheel; a friction member; and an actuator including (a) a piston configured to come into engagement with the friction member, (b) two electric motors each as a drive source, and (c) a motion converting mechanism configured to convert a rotating motion of each of the two electric motors into an advancing and retracting movement of the piston, the actuator being configured such that the piston is advanced to push the friction member against the rotation body so as to generate a braking force and the piston is retracted to move the friction member away from the rotation body so as to cancel the braking force.

3 Claims, 4 Drawing Sheets

(56) References Cited

U.S. PATENT DOCUMENTS

| | | | |
|---|---|---|---|
| 11,187,292 B2* | 11/2021 | Song | F16D 55/226 |
| 2004/0124042 A1* | 7/2004 | Kriz, II | F16D 65/18 |
| | | | 188/162 |
| 2009/0223752 A1* | 9/2009 | Kim | F16D 65/18 |
| | | | 188/72.1 |
| 2010/0126811 A1* | 5/2010 | Kim | F16D 65/18 |
| | | | 188/162 |
| 2014/0034432 A1* | 2/2014 | Bull | B60T 13/741 |
| | | | 188/106 R |
| 2018/0328430 A1 | 11/2018 | Feigel | |

FOREIGN PATENT DOCUMENTS

| | | |
|---|---|---|
| JP | 11-148522 A | 6/1999 |
| JP | 2017-094787 A | 6/2017 |

* cited by examiner

VEHICLE ELECTRIC BRAKE DEVICE

CROSS REFERENCE TO RELATED APPLICATION

The present application claims priority to Japanese Patent Application No. 2019-218325, which was filed on Dec. 2, 2019, the disclosure of which is herein incorporated by reference in its entirety.

BACKGROUND

Technical Field

The following disclosure relates to an electric brake device installed on vehicles.

Description of Related Art

Installation of an electric brake device on vehicles has been recently proposed. The electric brake device includes an electric motor as a drive source. In general, the electric brake device is configured such that a piston is advanced by a force of the electric motor and a friction member is pushed by the advancing movement of the piston against a rotation body that rotates with a wheel. If the electric brake device includes a plurality of electric motors each as the drive source, each of the electric motors can be downsized. For instance, Patent Document 1 (Japanese Patent Application Publication No. 2017-94787) describes a vehicle electric brake device including a plurality of electric motors. (The vehicle electric brake device will be hereinafter simply referred to as "electric brake device" where appropriate).

SUMMARY

The electric brake device described above includes two pistons, and the two pistons are moved respectively by two electric motors. The electric brake device is still under development, and there remains much room for improvement in the electric brake device. Thus, some modifications can enhance utility of the electric brake device. Accordingly, one aspect of the present disclosure is directed to an electric brake device having high utility.

In one aspect of the present disclosure, an electric brake device for a vehicle includes:

a rotation body that rotates with a wheel;

a friction member; and an actuator including (a) a piston configured to come into engagement with the friction member, (b) two electric motors each as a drive source, and (c) a motion converting mechanism configured to convert a rotating motion of each of the two electric motors into an advancing and retracting movement of the piston, the actuator being configured such that the piston is advanced to push the friction member against the rotation body so as to generate a braking force and the piston is retracted to move the friction member away from the rotation body so as to cancel the braking force.

The electric brake device of the present disclosure includes two electric motors each as the drive source, resulting in downsizing of the two electric motors. The downsizing of each electric motor can make inertia (inertial force) of the electric motor small. Thus, the electric brake device excellent in response can be achieved according to the present disclosure. Here, the response means the shortness of a time from a time point when a command to generate the braking force is issued to a time point when the braking force is actually generated. The electric brake device of the present disclosure is configured such that one piston is moved by the two electric motors. As compared with the electric brake device configured such that the two pistons are respectively moved by the two electric motors, the present electric brake device is simple in structure. Thus, the electric brake device of the present disclosure has high utility.

FORMS OF THE INVENTION

The electric brake device of the present disclosure may be configured such that the controller controls the two electric motors, respectively, in other words, the controller controls the two electric motors independently of each other, so as to control the braking force to be generated. For instance, the controller may include, as a principal constituent element, a computer constituted by a CPU, a ROM, a RAM, etc., and may further include drivers (drive circuits) for the respective two electric motors.

Control of the braking force by the controller will be explained. When a required braking force, which is the braking force required to be generated by the present electric brake device, is not greater than a set braking force, the controller may control only one of the two electric motors to push the friction member against the rotation body. When the required braking force is greater than the set braking force, the controller may control both of the two electric motors to push the friction member against the rotation body. The controller thus controls the two electric motors, whereby a possibility of mutual interaction of the two electric motors is eliminated, for instance, when the required braking force is not greater than the set braking force. Thus, the piston can be moved smoothly.

When the friction member is pushed against the rotation body by the force of both of the two electric motors, distribution of the force between the two electric motors is not limited to particular distribution. For instance, one of the two electric motors may be controlled so as to generate, by its force, the set braking force while the other of the two electric motors may be controlled so as to generate, by its force, the braking force corresponding to a difference between the required braking force and the set braking force, namely, a shortage with respect to the required braking force that cannot be provided by the set braking force. Instead, the two electric motors may be controlled to generate mutually equal forces, for instance.

Further, when an occurrence of locking of the wheel is estimated in what is called ABS operation (i.e., operation of the actuator in an antilock control), both of the two electric motors may be controlled to move the friction member away from the rotation body even if the friction member is being currently pushed against the rotation body by the force of only one of the two electric motors. It is desirable that the braking force be rapidly canceled when the locking of the wheel occurs. According to the control described above, when the occurrence of the locking of the wheel is estimated, the braking force can be promptly canceled, thus achieving an appropriate ABS operation. Here, the concept "the occurrence of the locking of the wheel is estimated" means not only a situation in which it is recognized that the wheel has completely locked, but also a situation in which it is estimated that the probability of the occurrence of the locking of the wheel has increased to a certain extent, namely, it is estimated that the wheel is about to lock. In other words, the concept means not only a situation in which it is recognized that the slip ratio has become equal to 100%, but also a situation in which it is recognized that the slip ratio has increased to such an extent that the wheel is about to lock.

In the ABS operation, the controller may control the two electric motors as follows. In a state in which the slip ratio of the wheel is greater than the set slip ratio, one of the two electric motors may be controlled such that the piston pushes the friction member against the rotation body while the other of the two electric motors may be controlled such that a retracting force is applied to the piston, the retracting force being a force in a direction in which the piston moves away from the rotation body. When the occurrence of the locking of the wheel is estimated, both of the two electric motors may be controlled such that the piston moves away from the rotation body. The state in which the slip ratio of the wheel is greater than the set slip ratio may be regarded as a state in which the probability that the locking of the wheel will occur shortly afterward is high, namely, a state slightly prior to the estimation of the occurrence of the locking of the wheel, in the process leading to the locking of the wheel. To stand by the locking of the wheel in this state, in other words, to promptly cancel the pushing of the friction member against the rotation body by the piston when the occurrence of the locking of the wheel is estimated, the retracting force by the other of the two electric motors is applied to the piston. The state in which the retracting force is applied to the piston by the other of the two electric motors will be hereinafter referred to as "standby state" where appropriate for representing a state for standing by the locking of the wheel.

The retracting force in the standby state preferably does not hinder the pushing of the friction member against the rotation body by the piston that depends on the force of the one of the two electric motors. In other words, the retracting force preferably does not hinder the braking force which is being applied to the wheel by the force of the one of the two electric motors. Accordingly, in the state in which the slip ratio of the wheel is greater than the set slip ratio, the other of the two electric motors is preferably controlled to apply, to the piston, the retracting force to such an extent that the braking force being currently generated does not substantially decrease.

Relationship between: a wheel slip ratio; and a friction force between a wheel and a road surface in a vehicle traveling direction is well known. (This friction force will be hereinafter simply referred to as "friction force" where appropriate). Specifically, the friction force increases as the slip ratio increases from 0% and peaks when the slip ratio becomes equal to about 15%-20%. The friction force subsequently decreases with a further increase in the slip ratio and becomes equal to a value at which a specific braking force is obtained when the slip ratio is equal to 100%. In view of this, the set slip ratio is preferably set based on the slip ratio at which the friction force peaks, namely, based on the slip ratio at which a grip force of the wheel with respect to the road surface is maximum. (This slip ratio will be hereinafter referred to as "peak slip ratio" where appropriate). Specifically, the peak slip ratio itself may be determined as the set slip ratio. Alternatively, the set slip ratio may be determined so as to be lower or higher than the peak slip ratio by allowing a slight margin for the peak slip ratio.

BRIEF DESCRIPTION OF THE DRAWINGS

The objects, features, advantages, and technical and industrial significance of the present disclosure will be better understood by reading the following detailed description of an embodiment, when considered in connection with the accompanying drawings, in which.

DETAILED DESCRIPTION OF THE EMBODIMENT

Figure 1A:
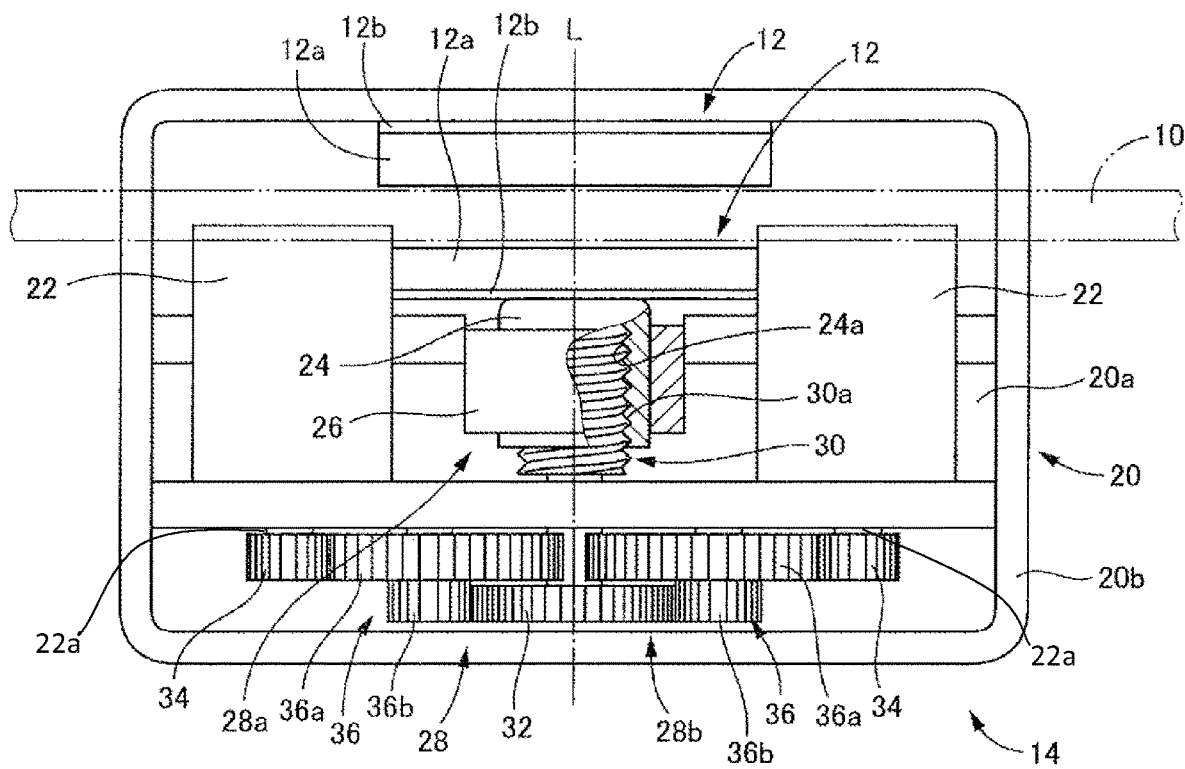
FIG. 1A is a plan view of a vehicle electric brake device according to one embodiment.

Referring to the drawings, there will be explained below in detail a vehicle electric brake device according to one embodiment of the present disclosure. It is to be understood that the present disclosure is not limited to the details of the following embodiment but may be changed and modified based on the knowledge of those skilled in the art.

A. Structure of Vehicle Electric Brake Device of Embodiment

Figure 1B:
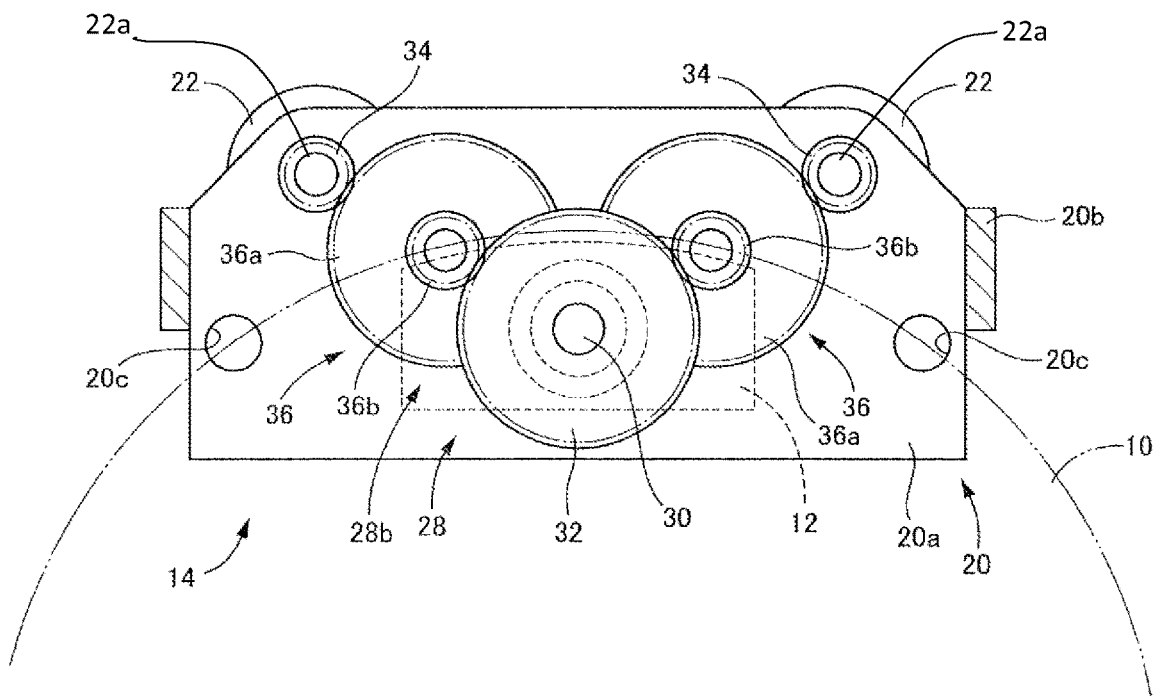
FIG. 1B is a front view of the electric brake device according to the embodiment.

An electric brake device according to the present embodiment is a disc brake device illustrated in a plan view of FIG. 1A and a front view of FIG. 1B (in which a front-side portion of the device is partly removed). The electric brake device includes a disc rotor 10 as a rotation body that rotates with a wheel, a pair of brake pads 12 disposed so as to interpose the disc rotor 10 therebetween, and an actuator 14 configured to push the brake pads 12 against the disc rotor 10 for applying a braking force to the wheel. The long dashed short dashed line in FIG. 1A indicates an axis L of the actuator 14 (hereinafter referred to as "actuator axis L" where appropriate). The actuator 14 is disposed such that the actuator axis L is parallel to an axis of the wheel, i.e., a wheel axis. In the following description, a direction in which the actuator axis L extends will be referred to as an axial direction, and a lower side and an upper side in FIG. 1A will be referred to as a body side in the axial direction and a counter-body side in the axial direction, respectively.

The disc rotor 10 is held by a carrier (not shown) together with the wheel (not shown) such that the disc rotor 10 is rotatable about the wheel axis. The carrier may be referred to as a steering knuckle in a case where the wheel is a steerable wheel. Each brake pad 12 includes a friction member 12a to be pushed against the disc rotor 10 and a backup plate 12b that backups the friction member 12a on one side of the friction member 12a opposite to the disc rotor 10. The brake pad 12 itself may be regarded as the friction member. In view of this, pushing the friction members 12a against the disc rotor 10 will be referred to as pushing the brake pads 12 against the disc rotor 10. Similarly, moving the friction members 12a away from the disc rotor 10, namely, allowing the friction members 12a to be moved away from the disc rotor 10, will be referred to as moving the brake pads 12 away from the disc rotor 10.

The actuator 14 includes a main body 20 constituted integrally by a base member 20a having a generally U-shaped cross section and opening upward and a frame 20b to an inside portion of which the base member 20a are bonded at opposite end portions thereof. Though a detailed structure is not explained, one of the two brake pads 12 located on the body side is held by the base member 20a while the other of the two brake pads 12 located on the counter-body side is held by the frame 20b, such that a displacement of the two brake pads 12 in the axial direction is allowed. Though a detailed structure is not explained, the main body 20 itself is held by the carrier such that its displacement in the axial direction is allowed utilizing support holes 20c formed through the base member 20a in the axial direction.

The actuator 14 includes two electric motors 22 each as a drive source. The two electric motors 22 are fixedly supported by the base member 20a. The actuator 14 further includes a piston 24 for pushing the brake pads 12 against the disc rotor 10. The piston 24 is held by the base member 20a so as to be movable in the axial direction via a holder sleeve 26 fixed to the base member 20a.

The actuator 14 includes a motion converting mechanism 28 configured to convert rotating motions of the respective two electric motors 22, namely, rotating motions of motor shafts 22a of the respective two electric motors 22, into an advancing and retracting movement of the piston 24 in the axial direction. Here, a movement of the piston 24 toward the body side in the axial direction will be referred to as a retracting movement while a movement of the piston 24 toward the counter-body side in the axial direction will be referred to as an advancing movement. The actuator 14 advances the piston 24 to cause the brake pads 12 to be pushed against the disc rotor 10, so as to generate the braking force. The actuator 14 retracts the piston 24 to cause the brake pads 12 to be moved away from the disc rotor 10, namely, to allow the brake pads 12 to be moved away from the disc rotor 10, so as to cancel the braking force.

A female thread 24a is formed on the piston 24. A main shaft 30, which has a male thread 30a held in threaded engagement with the female thread 24a, is held by the base member 20a such that the main shaft 30 is rotatable and immovable in the axial direction. By rotating the main shaft 30, the piston 24 moves in the axial direction. That is, a converting portion 28a of the motion converting mechanism 28 is constituted by the main shaft 30 and the portion of the piston 24 on which the female thread 24a is formed.

The main shaft 30 extends from the base member 20a toward the body side. A driven gear 32, which is a spur gear having a relatively large diameter, is fixedly fitted on the extended portion of the main shaft 30. The motor shaft 22a of each electric motor 22 extends from the base member 20a toward the body side. A drive gear 34, which is a spur gear having a relatively small diameter, is fixedly fitted on the extended portion of each motor shaft 22a. Two intermediate gears 36 are rotatably held by the base member 20a such that each of the two intermediate gears 36 connects a corresponding one of the drive gears 34 and the driven gear 32. Specifically, each intermediate gear 36 is constituted integrally by a large-diameter gear 36a that is a spur gear having a relatively large diameter and a small-diameter gear 36b that is a spur gear having a relatively small diameter. The large-diameter gear 36a is in mesh with a corresponding one of the drive gears 34 while the small-diameter gear 36b is in mesh with the driven gear 32. In the structure, the driven gear 32, the two intermediate gears 36, and the two drive gears 34 constitute a functional portion for decelerating the rotation of each electric motor 22 and transmitting the decelerated rotation to the main shaft 30, namely, the driven gear 32, the two intermediate gears 36, and the two drive gears 34 constitute a speed reducer 28b of the motion converting mechanism 28.

As is clear from the structure described above, the motion converting mechanism 28 is configured to convert the rotating motions of any of the two electric motors 22 into the advancing and retracting movement of the piston 24. Specifically, by supplying an electric current to only one of the two electric motors, the piston 24 can be advanced and retracted only by a force of the one of the two electric motors 22. (The force will be hereinafter referred to as "motor torque" where appropriate.) Instead, the two electric motors 22 can cooperate with each other, so as to advance and retract the piston 24 by the motor torques of the two electric motors 22.

Figure 2A:
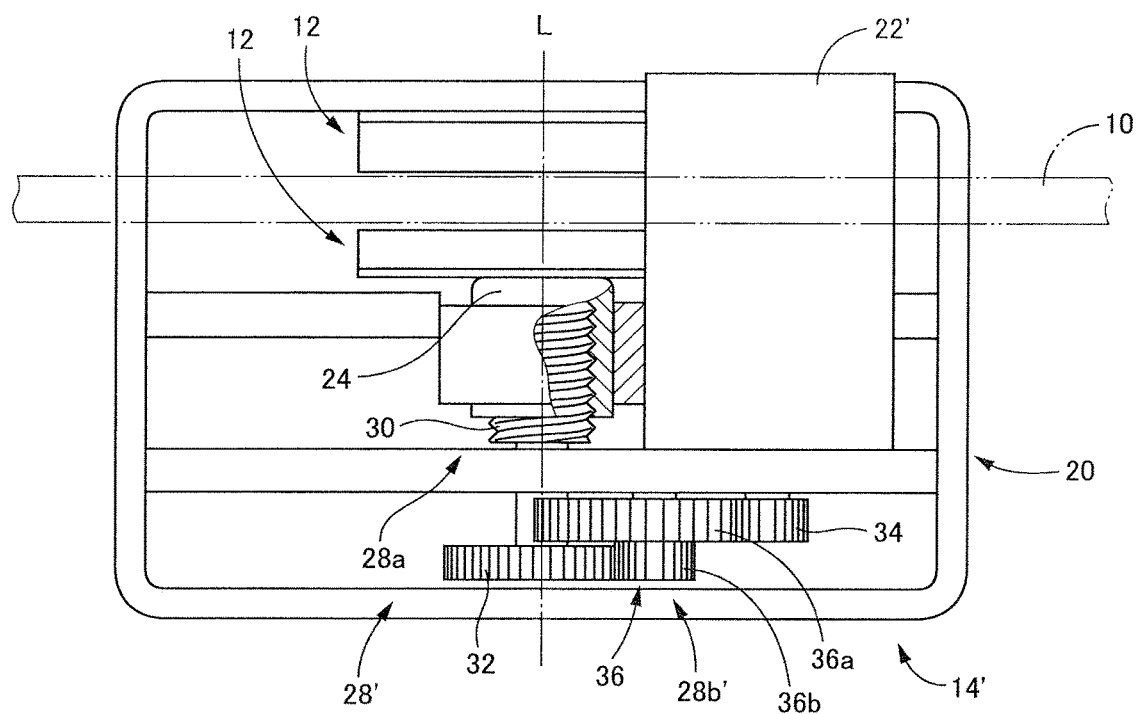
FIG. 2A is a plan view of a vehicle electric brake device according to a comparative example.
Figure 2B:
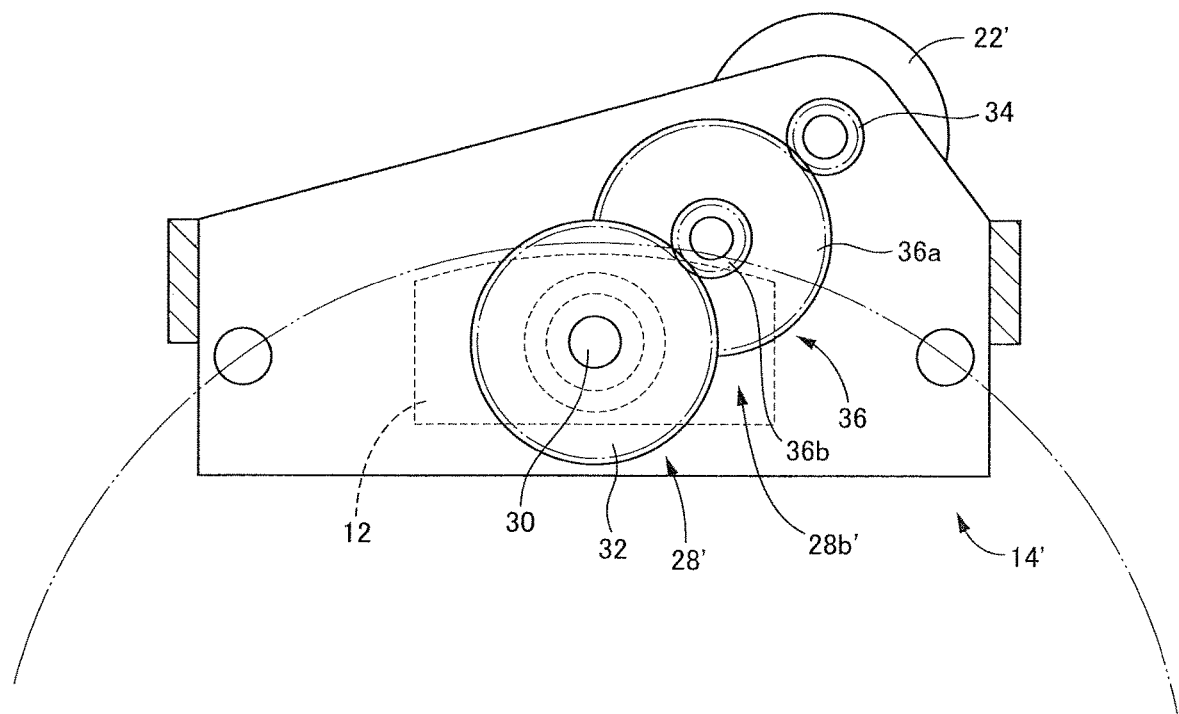
FIG. 2B is a front view of the electric brake device according to the comparative example.

Here, an electric brake device according to a comparative example will be explained referring to a plan view of FIG. 2A and a front view of FIG. 2B (in which a front-side portion of the device is partly removed). The electric device according to the comparative example includes only one electric motor as the drive source. An actuator 14' of the electric brake device according to the comparative example includes one electric motor 22' as the drive source. The electric motor 22' is large-sized, as compared with each electric motor 22 that the electric brake device of the present embodiment includes as the drive source. Specifically, the electric motor 22' is configured to generate a motor torque about twice as large as the motor torque that can be generated by each electric motor 22. The large-sized electric motor 22' has an outside diameter considerably larger than that of the electric motors 22. As apparent from a comparison between FIG. 1 and FIG. 2, the electric brake device according to the embodiment including the relatively small-sized two electric motors 22 each as the drive source is compact in size, as compared with the electric brake device according to the comparative example including the relatively large-sized electric motor 22' as the drive source. The electric brake device according to the comparative example including only one electric motor 22' as the drive source has a motion converting mechanism 28' (speed reducer 28b') different in structure from the motion converting mechanism 28 (the speed reducer 28b) of the electric brake device of the present embodiment.

In driving the electric motor, namely, in starting to generate the motor torque or changing the magnitude and the direction of the motor torque, it is needed to drive the electric motor against inertia (inertial force) of the electric motor. From this viewpoint, the electric brake device of the embodiment having the relatively small-sized electric motors 22 is excellent in response of the motor torque and accordingly excellent in response of the braking force, as compared with the electric brake device of the comparative example having the relatively large-sized electric motor 22'. In this respect, the diameter of the electric motors 22 smaller than that of the electric motor 22' contributes particularly to good response.

As one example of the electric brake device including the two electric motors each as the drive source, there may be conceived an electric brake device configured such that the two electric motors move respective two pistons via respective two motion converting mechanisms. As compared with such an electric brake device, the electric brake device of the embodiment is simple in structure.

B. Control of Vehicle Electric Brake Device of Embodiment

The electric brake device of the embodiment, namely, the braking force to be generated by the electric brake device, is controlled by a controller (not shown). The controller includes a computer including a CPU, a ROM, a RAM, etc., and drive circuits (drivers) for the respective two electric motors 22. Each electric motor 22 is a three-phase brushless motor, and each drive circuit is an inverter. While not illustrated, the electric brake device of the embodiment is provided with an axial force sensor for detecting an axial force (thrust force) that acts on the main shaft 30 as a reaction force of the pushing of the brake pads 12 against the disc rotor 10 by the piston 24. The controller controls operations of the two electric motors 22 independently of each other based on the axial force detected by the axial force sensor. That is, the controller controls the two electric motors 22 independently of each other, thereby controlling the braking force to be generated.

There will be briefly explained basic control of the braking force. The controller determines, as a required braking force, the braking force that should be generated by the electric brake device, namely, the braking force required to be generated by the electric brake device, based on an operation amount of a brake pedal as a brake operation member. Based on the required braking force, the controller determines a force by which the piston 24 pushes the brake pads 12 against the disc rotor 10, i.e., a target pushing force. As explained above, the axial force is the reaction force of the pushing force. Accordingly, the target pushing force is equal to a target axial force that should be generated, and determination of the target pushing force means determination of the target axial force. The controller identifies, as an axial force deviation, a deviation of the axial force detected by the axial force sensor (hereinafter referred to as "actual axial force" where appropriate) from the target axial force. Based on the axial force deviation, the controller feedback controls supply currents to the respective two electric motors 22.

The electric brake device of the present embodiment includes the two electric motors 22 each as the drive source, and the manner of supplying the electric currents to the two electric motors 22 is characteristic. Specifically, when the required braking force is not greater than a set braking force (which is set as a maximum braking force that can be generally generated by one electric motor 22), the electric current is supplied to only one of the two electric motors 22 (hereinafter referred to as "main motor" where appropriate) for generating the braking force only by the main motor. When the required braking force becomes greater than the set braking force, there is supplied, to the one of the two electric motors 22, the electric current that enables the set braking force to be kept generated, and there is supplied, to the other of the two electric motors 22 (hereinafter referred to as "sub motor" where appropriate), the electric current for generating the braking force corresponding to a difference between the required braking force and the set braking force, namely, the electric current for generating an insufficient braking force that is a shortage with respect to the required braking force that cannot be provided by the set braking force. That is, the electric brake device of the present embodiment is configured such that only the main motor 22 is controlled to push the brake pads 12 against the disc rotor 10 when the required braking force is not greater than the set braking force and such that both the main motor 22 and the sub motor 22 are controlled to push the brake pads 12 against the disc rotor 10 when the required braking force is greater than the set braking force.

In the electric brake device of the present embodiment, an ABS control (antilock control or antiskid control) is executed. The controller obtains a slip ratio of the wheel to which the electric brake device applies the braking force (hereinafter referred to as "subject wheel" where appropriate) based on: a rotational speed of the subject wheel; and a vehicle running speed that is determined based on the rotational speeds of the subject wheel and the other wheels. The controller executes the ABS control based on the slip ratio.

Figure 3:
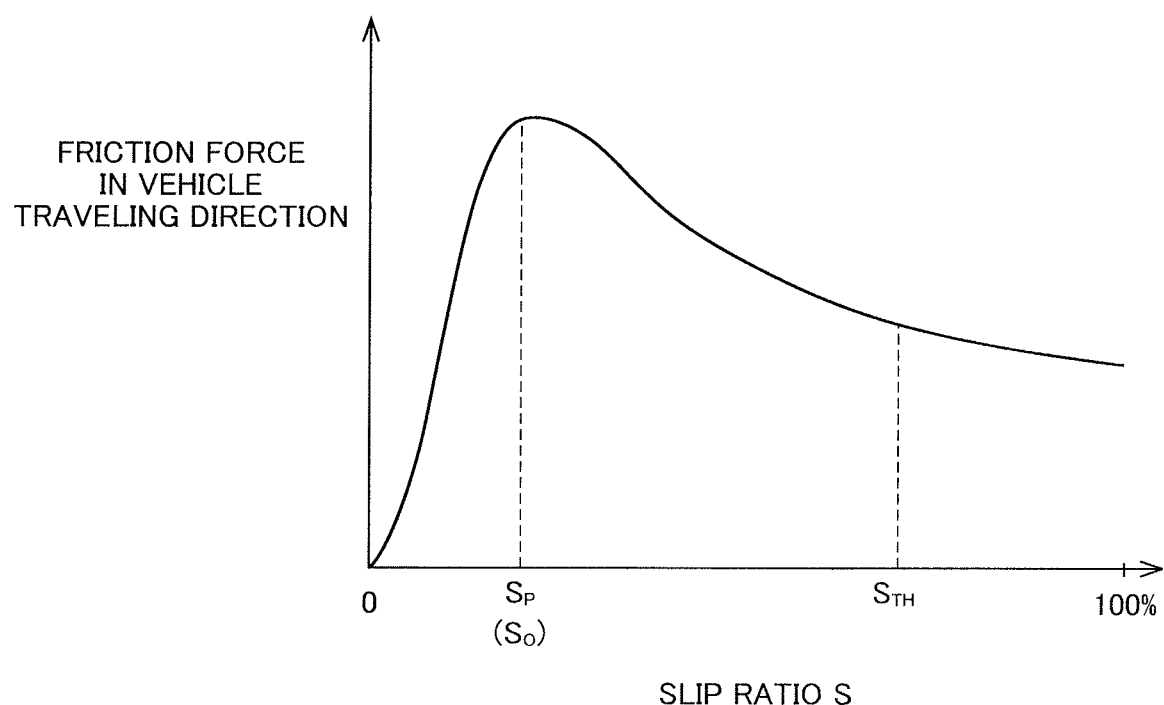
FIG. 3 is a graph indicating a relationship between: a wheel slip ratio; and a friction force between a wheel and a road surface in a vehicle traveling direction.

FIG. 3 is a graph indicating a relationship between: the slip ratio of the wheel; and a friction force between the wheel and a road surface in a vehicle travelling direction. The controller cancels the braking force being currently applied by the electric brake device when a slip ratio S of the subject wheel exceeds a slip ratio (threshold slip ratio) $S_{TH}$ at which it is estimated that the probability of the occurrence of the locking of the wheel has increased to a certain extent. In this respect, the threshold slip ratio $S_{TH}$ is set so as to be somewhat lower than 100% that is the slip ratio in a state in which the wheel completely locks.

The operation of the electric brake device relating to the ABS control will be hereinafter referred to as an ABS operation. The braking force in the ABS operation needs to be controlled promptly. In the electric brake device, therefore, the controller controls both the main motor 22 and the sub motor 22 to move the brake pads 12 away from the disc rotor 10 even if the required braking force is not greater than the set braking force, namely, even if the brake pads 12 are being currently pushed against the disc rotor 10 by only the force of the main motor 22. Specifically, the controller supplies allowable maximum electric currents to the two electric motors 22 to retract the piston 24, whereby the brake pads 12 are allowed to be moved away from the disc rotor 10. Thus, the braking force is cancelled in the electric brake device considerably speedily owing to the advantage that the inertia of the electric motors 22 is small.

In the ABS operation, the controller detects a sign of the locking of the wheel and prepares for cancellation of the braking force. Specifically, in the state in which the slip ratio S of the wheel is greater than the set slip ratio $S_0$, the controller controls the main motor 22 such that the piston 24 pushes the brake pads 12 against the disc rotor 10 while controlling the sub motor 22 such that the retracting force, which is a force in a direction in which the piston 24 moves away from the disc rotor 10, is applied to the piston 24. The state in which the electric motors 22 are thus controlled will be referred to as a standby state. The standby state intervened before the cancellation of the braking force enables subsequent cancellation of the braking force to be executed promptly.

As apparent from FIG. 3, the set slip ratio $S_0$ is set around the peak slip ratio $S_P$ based on the slip ratio at which the friction force in the vehicle traveling direction is maximum, namely, based on the peak slip ratio $S_P$. Specifically, the set slip ratio $S_0$ is set to the peak slip ratio $S_P$ with respect to an ordinary road surface, namely, an ordinary paved road surface except a road surface in particular states such as a wet road surface.

It is noted that the motor torque of the sub motor 22 in the standby state should not hinder generation of an appropriate braking force. Thus, the motor torque of the sub motor 22 in the standby state is made equal to a level at which the braking force being currently generated by the main motor 22 does not substantially decrease. In other words, the electric current in the reverse direction supplied to the sub motor 22 is a considerably small electric current, i.e., a minute electric current, as compared with the electric current in the forward direction supplied to the main motor 22. Specifically, the sub motor 22 is controlled to generate the motor torque to such an extent that a backlash present between the drive gear 34 attached to the sub motor 22 and the driven gear 32 in the speed reducer 28b of the motion converting mechanism 28 is eliminated.

Figure 4:
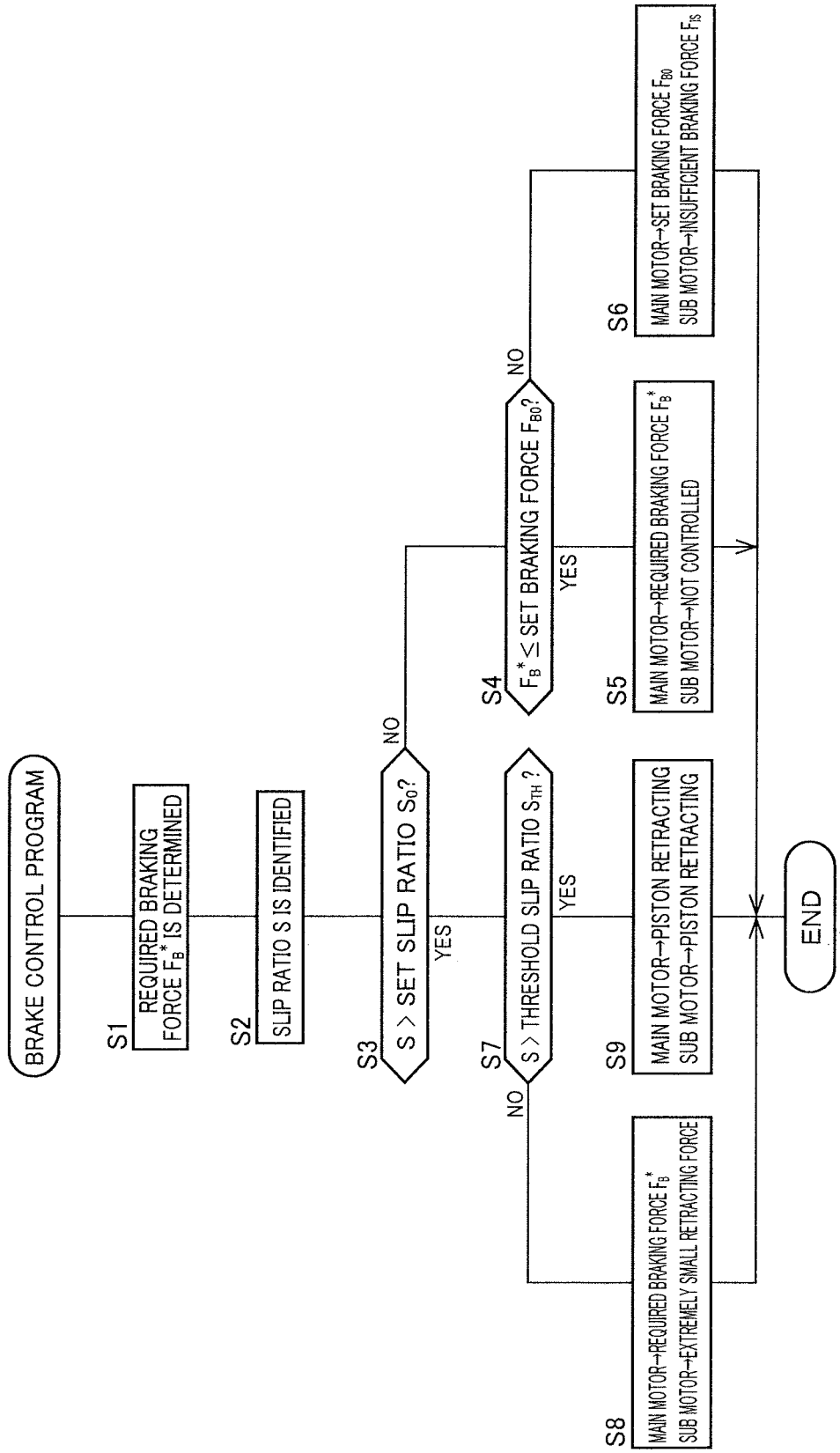
FIG. 4 is a flowchart indicating a brake control program executed in the electric brake device according to the embodiment.

The computer of the controller repeatedly executes a brake control program indicated by a flowchart of FIG. 4 at a short time pitch, e.g., from several to several tens of milliseconds (msec), so that the control including the ABS control is executed. There will be briefly explained processing executed in accordance with the program.

In the processing according to the brake control program, the required braking force $F_B^*$ is determined at Step 1 based on the operation amount of the brake pedal. (Step S1 is abbreviated as "S1", and other steps will be similarly abbreviated.) At S2, the slip ratio S is identified.

At S3, it is determined whether the slip ratio S is greater than the set slip ratio $S_0$. When it is determined that the slip ratio S is not greater than the set slip ratio $S_0$, it is determined at S4 whether the required braking force $F_B^*$ is not greater than the set braking force $F_{B0}$. When it is determined that the required braking force $F_B^*$ is not greater than the set braking force $F_{B0}$, the control flow proceeds to S5 at which the electric current for generating the required braking force $F_B^*$ is supplied to the one of the two electric motors 22, i.e., the main motor 22, while the other of the two electric motors 22, i.e., the sub motor 22, is not controlled. That is, the sub motor 22 is placed into a state in which the sub motor 22 does not substantially generate a resistance by external rotational input. On the other hand, when it is determined that the required braking force $F_B^*$ is greater than the set braking force $F_{B0}$, the control flow proceeds to S6 at which the electric current for generating the set braking force $F_{B0}$ is supplied to the main motor 22 while the electric current for generating an insufficient braking force $F_{IS}$, which is a shortage with respect to the required braking force $F_B^*$ that cannot be covered by the set braking force $F_{B0}$, is supplied to the sub motor 22.

When it is determined at S3 that the slip ratio S is greater than the set slip ratio $S_0$, it is determined at S7 whether the slip ratio S is greater than the threshold slip ratio $S_{TH}$. When it is determined that the slip ratio S is not greater than the threshold slip ratio $S_{TH}$, the control flow proceeds to S8 at which the electric current for generating the required braking force $F_B^*$ is supplied to the main motor 22 while the electric current for applying the extremely small retracting force to the piston 24 is supplied to the sub motor 22, so as to establish the standby state. In this respect, when the required braking force $F_B^*$ is greater than the set braking force $F_{B0}$, only the electric current sufficient for generating the set braking force $F_{B0}$ is supplied to the main motor 22. This leads to a decrease in the braking force. However, the decrease in the braking force hardly hinders the appropriate operation of the electric brake device because the braking force will be probably cancelled following the standby state.

When it is determined at S7 that the slip ratio S is greater than the threshold slip ratio $S_{TH}$, the control flow proceeds to S9 at which the allowable maximum electric currents in the reverse direction are supplied to the main motor 22 and the sub motor 22 for retracting the piston 24.

What is claimed is:

1. An electric brake device for a vehicle, comprising:
    a rotation body that rotates with a wheel;
    a friction member;
    an actuator including (a) a piston configured to come into engagement with the friction member, (b) two electric motors each as a drive source, and (c) a motion converting mechanism configured to convert a rotating motion of each of the two electric motors into an advancing and retracting movement of the piston, the actuator being configured such that the piston is advanced to push the friction member against the rotation body so as to generate a braking force and the piston is retracted to move the friction member away from the rotation body so as to cancel the braking force; and
    a controller configured to control the two electric motors independently of each other so as to control the braking force to be generated,
    wherein, in a state in which a slip ratio of the wheel is greater than a set slip ratio, the controller controls one of the electric motors such that the piston pushes the friction member against the rotation body while controlling the other of the two electric motors such that a retracting force is applied to the piston, the retracting force being a force in a direction in which the piston moves away from the rotation body, and
    wherein, when an occurrence of locking of the wheel is estimated, the controller controls both of the two electric motors such that the piston moves away from the rotation body.

2. The electric brake device according to claim 1, wherein, in the state in which the slip ratio of the wheel is greater than the set slip ratio, the controller controls the other of the two electric motors to apply, to the piston, the retracting force to such an extent that the braking force being currently generated does not substantially decrease.

3. The electric brake device according to claim 1, wherein the set slip ratio is determined in advance based on a slip ratio at which a friction force between the wheel and a road surface in a traveling direction of the vehicle is maximum.

* * * * *